United States Patent [19]

Ma

[11] Patent Number: 4,742,557
[45] Date of Patent: May 3, 1988

[54] ADAPTIVE CHARACTER EXTRACTION METHOD AND SYSTEM

[75] Inventor: Hung S. Ma, Beaconsfield, Canada

[73] Assignee: NCR Corporation, Dayton, Ohio

[21] Appl. No.: 796,454

[22] Filed: Nov. 8, 1985

[51] Int. Cl.$^4$ .............................................. G06K 9/40
[52] U.S. Cl. ........................................ 382/51; 382/54
[58] Field of Search ................. 382/51, 18, 27, 50, 382/52, 53, 54; 358/280, 282

[56] References Cited

U.S. PATENT DOCUMENTS

| | | | |
|---|---|---|---|
| 3,715,724 | 2/1973 | Demonte et al. | 340/146.3 |
| 3,737,855 | 6/1973 | Cutaia | 340/146.3 |
| 4,544,393 | 3/1986 | Blackwell et al. | 382/18 |
| 4,554,593 | 11/1985 | Fox et al. | 358/282 |
| 4,646,355 | 2/1987 | Petrick et al. | 382/54 |
| 4,656,665 | 4/1987 | Pennebaker | 382/51 |

FOREIGN PATENT DOCUMENTS 0055965 12/1981 European Pat. Off. .

Primary Examiner—Leo H. Boudreau
Attorney, Agent, or Firm—Wilbert Hawk, Jr.; Albert L. Sessler, Jr.; Edward Dugas

[57] ABSTRACT

A method and a system for extracting character information from a signal matrix of gray level picture elements which compares pixel elements positioned in annular rings around a central pixel of interest to determine neighbor pair occurrences for purposes of eliminating spurious signals and for establishing a threshold for each document read which is used to eliminate undesired signals from the signal matrix.

9 Claims, 20 Drawing Sheets

NORMALIZED HISTOGRAM OF THE ENTIRE GRAY LEVEL IMAGE

NORMALIZED HISTOGRAM OF THE EXTRACTED GRAY LEVEL IMAGE

ANNULAR RING

| $R_7$ | $R_5$ |
|---|---|
| 1 | 1 |
| 2 | 2 |
| 3 | 2 |
| 4 | 3 |
| 5 | 4 |
| 6 | 4 |
| 7 | 5 |
| 8 | 6 |
| 9 | 7 |
| 10 | 7 |
| 11 | 8 |
| 12 | 9 |
| 13 | 10 |
| 14 | 10 |
| 15 | 11 |
| 16 | 12 |
| 17 | 12 |
| 18 | 13 |
| 19 | 14 |
| 20 | 15 |
| 21 | 15 |
| 22 | 16 |
| 23 | 17 |
| 24 | 17 |
| 25 | 18 |
| 26 | 19 |
| 27 | 20 |
| 28 | 20 |
| 29 | 21 |

| $R_7$ | $R_5$ |
|---|---|
| 30 | 22 |
| 31 | 22 |
| 32 | 23 |
| 33 | 24 |
| 34 | 24 |
| 35 | 25 |
| 36 | 26 |
| 37 | 27 |
| 38 | 28 |
| 39 | 28 |
| 40 | 29 |
| 41 | 30 |
| 42 | 30 |
| 43 | 31 |
| 44 | 32 |
| 45 | 32 |
| 46 | 33 |
| 47 | 34 |
| 48 | 34 |
| 49 | 35 |
| 50 | 36 |
| 51 | 37 |
| 52 | 38 |
| 53 | 38 |
| 54 | 39 |
| 55 | 40 |
| 56 | 40 |

FIG. 8B

ANNULAR RING

| $R_5$ | $R_3$ |
|---|---|
| 1 | 1 |
| 2 | 2 |
| 3 | 2 |
| 4 | 3 |
| 5 | 3 |
| 6 | 4 |
| 7 | 5 |
| 8 | 5 |
| 9 | 6 |
| 10 | 6 |
| 11 | 7 |
| 12 | 8 |
| 13 | 8 |
| 14 | 9 |
| 15 | 9 |
| 16 | 10 |
| 17 | 11 |
| 18 | 11 |
| 19 | 12 |
| 20 | 12 |
| 21 | 13 |

| $R_5$ | $R_3$ |
|---|---|
| 22 | 14 |
| 23 | 14 |
| 24 | 15 |
| 25 | 15 |
| 26 | 16 |
| 27 | 17 |
| 28 | 17 |
| 29 | 18 |
| 30 | 18 |
| 31 | 19 |
| 32 | 20 |
| 33 | 20 |
| 34 | 21 |
| 35 | 21 |
| 36 | 22 |
| 37 | 23 |
| 38 | 23 |
| 39 | 24 |
| 40 | 24 |

ADAPTIVE CHARACTER EXTRACTION METHOD AND SYSTEM

BACKGROUND OF THE INVENTION

The present invention is a method and a system that relates generally to the field of automatic document scanners/readers. More particularly, the present invention is directed to a method and a system for extracting relevant character information from fields of scanning data which contain unwanted background information and noise that is picked up in the scanning process.

When a document such as a check is scanned for relevant information, the scanner is unable to determine what changes in reflectivity are caused by character information, noise, and/or scenic background. Various types of systems using noise filters and extraction algorithms attempt to separate the character information from such unwanted signals.

Prior art systems utilize those features associated with a gray level difference between small square shaped areas of a document. Each square area is called a "picture element" or a "pixel". Gray level differences are looked at in different combinations but generally the gray level of a central pixel is compared against the gray level of its local neighbors. U.S. Pat. No. 4,510,618 entitled, Noise Cleaner for Binary Images by E. Ataman et al., is such a system. Systems of that type are provided with multiple level threshold detectors determining the gray value of an incoming signal. The threshold levels are set against an industry standard. The industry standard, sometimes referred to as global dynamic thresholding curves, was derived by sampling a group of training checks and statistically arriving at an average set of curves which can be used for threshold setting.

When a check having both character images and background images is scanned, the contrast difference between the average gray level of a character pixel and the average gray level of the local pixels, or locally scattered average gray levels, is significantly larger than when the gray level of a background pixel is compared with the average gray level of other local background pixels. As a truism, the darker the pixel, the higher the probability that it belongs to the character pixel population. As a result, a dynamic thresholding which uses a lower thresholding value for darker pixels and a higher thresholding value for lighter pixels will provide an improved character extraction system.

The industries' dynamic thresholding curves, being based on the global statistics of a training set of check samples is not at all optimum for any individual check, but rather is statistically optimum for an ensemble of checks. Another problem associated with the global dynamic thresholding schemes is that it is assumed that the characteristics of future checks will be the same as the characteristics of the present training set. It is not obvious that this would be true. If not, constant up-date (or fine tuning) of the dynamic thresholding curves will be required and systems based on those curves would have to be adjusted accordingly.

With existing systems, the amount of unwanted background information remaining in the images processed is relatively large and tends to hamper processing of the data. The elimination of more background information, without degradation of the desired character information, would definitely provide an improved system.

SUMMARY OF THE INVENTION

The present inventive method and system uses not only gray level comparisons, but also the comparison of topological features (i.e. geometrical distribution of character pixels), to adaptively adjust a threshold for each individual check which threshold determines the cut-off from consideration of character information.

A preferred method of the present invention, for extracting relevant character information from a signal matrix of gray level picture elements, comprises the steps of: extracting the signals representing the gray level picture elements that are positioned approximately a first equal distance from a pixel of interest at positions representing a first annular ring and extracting the signals representing the gray level picture elements that are positioned approximately a second equal distance from the pixel of interest at positions representing a second annular ring of picture elements. The extracted signals are then analyzed for like pairs of picture elements being present in the first and the second annular ring positions. The pixel of interest is deemed (established) to be of a first binary value when there is at least one pair of picture elements and of a second binary value when there is not. The steps are then repeated for each pixel of interest so as to form a signal matrix of binarized picture elements based on the signal matrix of gray level picture elements. The preferred method facilitates the extraction of character information from the signal matrix of gray level picture elements.

A preferred system of the present invention, for processing a matrix of gray level picture elements, comprises; an annular ring binarizer means for receiving gray signals representing levels of the picture elements located in a first and a second annular ring centered about a pixel of interest and for converting the gray level signals into corresponding binary output signals, and an adaptive post threshold means operatively coupled to the annular ring binarizer means for receiving the binary output signals and the gray signals and for forming a gray level histogram based on the signals. The adaptive post threshold means, also deriving an adaptive threshold as a function of the characteristics of the input signals, determines the cut-off from consideration of the gray level signals above the threshold.

BRIEF DESCRIPTION OF THE DRAWINGS

FIGS. 8A and 8B together form a look up table of neighborhood pixel elements of two consecutive rings.

DETAILED DESCRIPTION OF THE INVENTION

The preferred system operates upon a gray level image that is 512 pixels by 640 pixels in area. In picking the area size of the gray level image consideration was given to the physical size of a typical bank check such that the right-half portion of the check would be covered. The right-half portion of the check carries most, if not all, of the information of interest for data processing.

Referring to FIGS. 1A through 1D, four simple geometrical configurations of a portion of a character line 10 are illustrated. Each character line 10, when scanned at a radius r from a central pixel P, will evidence the existence of at least one line segment 11 positioned a distance from the central pixel P. The following topological features are observed:

In FIG. 1(a) there is at least one line segment 11 located r units away from the central character pixel P on the line 10. The line 10 terminates on the right side prior to reaching a length equal to or greater than r, therefore only one line segment 11 will be detected. The average gray level in the line 11 is approximately equal to the gray level of the central pixel P. The gray level is depicted by the hashed lines. Any short character line or noise patch which is smaller than r units from the central character pixel will not be registered.

In FIG. 1(b) the line 10 is longer than 2r and therefor two line segments 11, having the same gray level will be detected.

In FIG. 1(c) The character line 10 changes angle but the line segments have the same gray level.

In FIG. 1(d) a character line 10 having multiple legs is shown having three line segments 11 positioned a distance r from the central pixel P.

In order to detect character lines with all possible orientations (at different angles) with respect to a central character point P, an analysis is performed on the gray levels of those pixels positioned along paths equivalent to concentric annular rings that center on the character pixel P. Each annular ring is 1 pixel in width and defines a discrete domain in which the analysis of line segments is performed.

Figure 1:
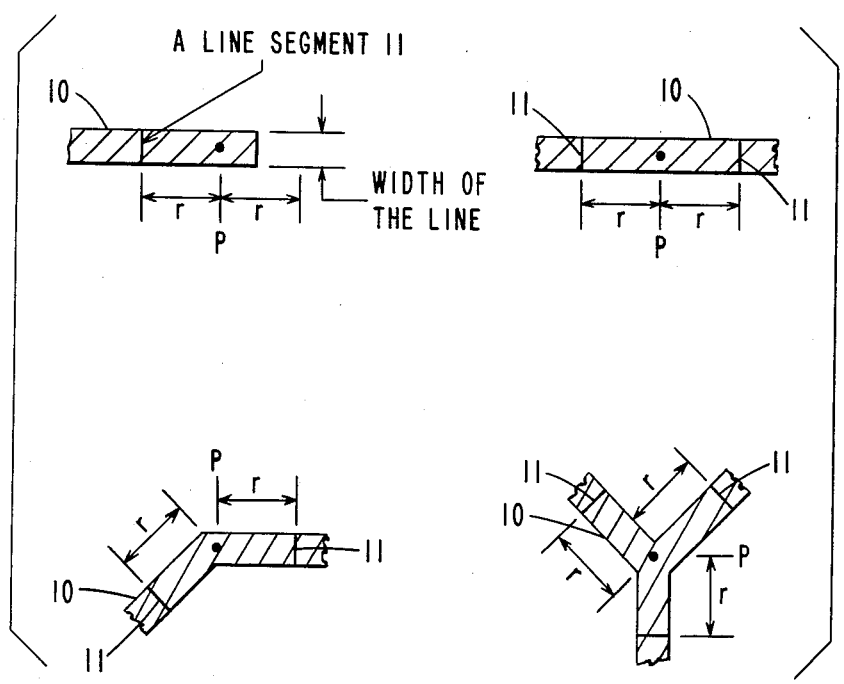
FIG. 1 illustrates some topologies of a character line.
Figure 2:
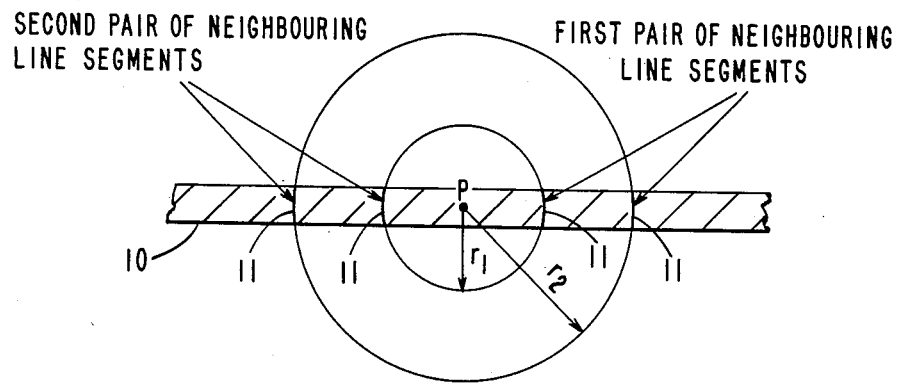
FIG. 2 illustrates annular rings intersecting sections of a character line.

In FIG. 2, an example of two concentric annular ring paths, centered around pixel P at radii $r_1$ and $r_2$, is shown. As can be seen in FIG. 2, the gray level of the character line 10 is substantially constant along its length, and different, as compared to the surrounding area. The line segments 11 (pixels) will thus all be of the same gray level along the length of the character line. Considering the pixels that would be in the paths defined by the annular rings, there will be two identical pairs (neighbors) of line segments 11 having the same gray level. All other pixels on the annular paths may have a different gray level from that of the pairs of line segments.

Figure 3:
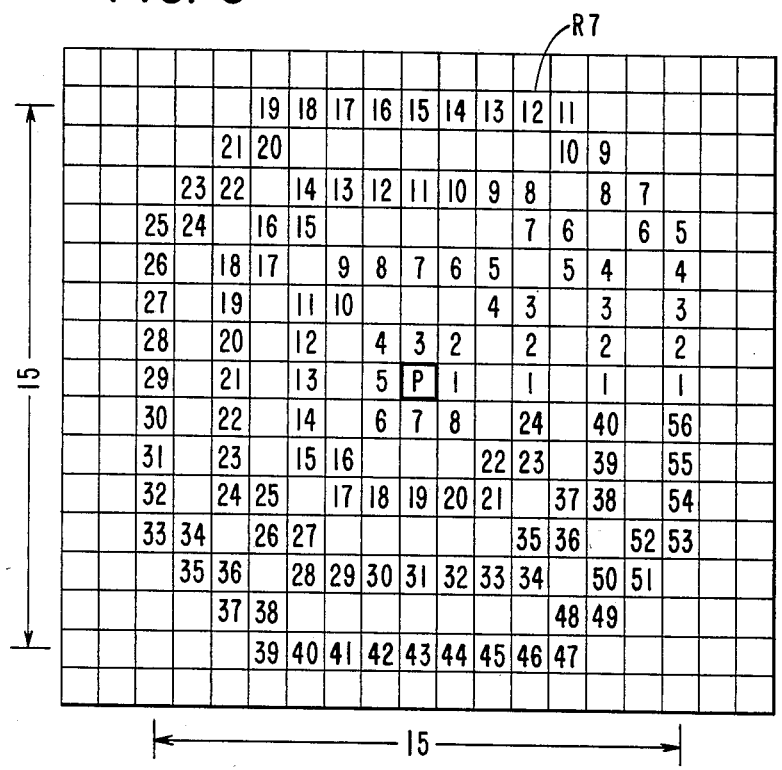
FIG. 3 illustrates a matrix of pixels with discrete annular rings comprised of numbered pixels located around a central pixel.

An example of annular ring consideration of pixels positioned in a matrix form is shown in FIG. 3. The matrix of 15×15 pixels has a central pixel P as shown. Each pixel may have a gray value of 0 through 255 dependent on its lightness or darkness. The 256 levels are electronically determined by optically scanning a document to derive an analog signal the levels of which range between an assigned threshold value equal to pure black, 0, and an assigned threshold value equal to pure white, 255. A threshold detector having 255 discrete threshold levels compares the input signals, one pixel at a time against the assigned thresholds and provides a gray level output indicative of the particular amplitude of the analog signal. The provided output is a function of one of the 256 available gray levels and corresponds to the average gray value within that pixel. The sampling density which determines the size of each pixel, in the preferred embodiment, was 315 pixels per inch horizontally and 315 pixels per inch vertically.

In the preferred embodiment of the invention the pixels that are of interest are those which are positioned in the matrix at the end of radii extending outward to discrete annular rings, located at 5 pixel units ($R_5$) and 7 pixel units ($R_7$) from the central pixel P. The number shown with each pixel corresponds to the physical position of the pixel in the annular ring and not to the pixel's gray level. The first positions 1 commence at the 3 o'clock position, from central pixel P, and increase by a unit count, in the counterclockwise direction. A string of pixels for a ring, for example, ring $R_7$, would consecutively include the pixels numbered 1 through 56 that appear 7 pixel units from the central pixel P.

Changing gray level signals to binary signals, either a zero (0) or a one, (1), can be accomplished by setting a threshold value, corresponding to a particular gray level, and by comparing the gray level of a pixel against the set threshold value it can be determined if the gray level of the pixel is above or below the threshold. If above, the pixel can be denoted (established) as being white and a zero (0). If below, the pixel can be denoted as being black and a one (1). In addition, topological features can be used to binarize pixel gray levels, i.e., a pixel P is deemed black (denoted a 1-pixel) if there is at least one pair of neighboring line segments that is found in two consecutive annular rings with radius $r_1$ and $r_2$, centered at P. If a pixel is not denoted as a 1 it is denoted as a 0 and is deemed white, the aforementioned will be referred to as the "neighborhood rule".

A binarizer, based on the annular ring topological features of pixels, provides a binarized output which has a great percentage of the character pixels in the scanned area binarized to be 1-pixels and a great percentage of the background pixels in the scanned area binarized to be 0-pixels. This intrinsic property of the binarizer suggests that a gray level histogram, generated from the gray level for only those pixels with a corresponding 1-pixel in the binarized image, will provide more informative information about the actual gray level distribution of the character pixels than will a gray level histogram of the entire image. A histogram reflects the frequency of occurrence of pixels of like gray levels for the area scanned.

Figure 4:
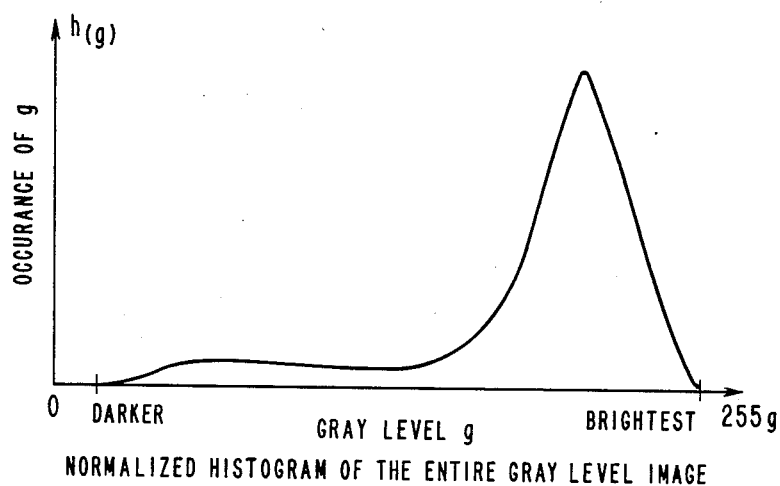
FIG. 4 is a normalized histogram of a scanned image in gray level.
Figure 5:
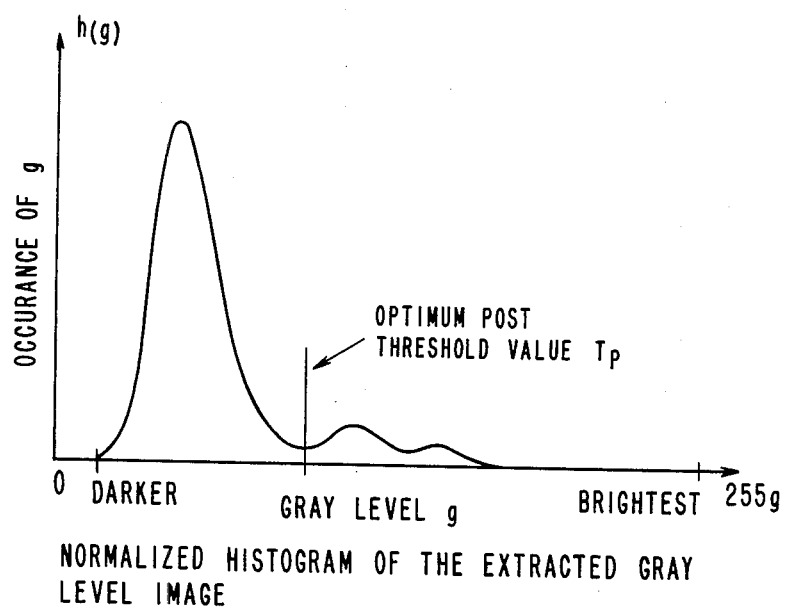
FIG. 5 is a normalized histogram with the brighter gray levels extracted.

In FIG. 4 there is shown a histogram wherein the occurrence of pixels having gray levels between 0 and 255 for a document such as a check is plotted. To be noted is that the occurrence of the bright pixels far outweighs the occurrence of the darker pixels. We know that the darker pixels correspond more to the information about the character, therefore, by ignoring those pixels having a gray value above a particular threshold and amplifying (normalizing) the remaining occurrences, the histogram of FIG. 5 can be derived. The darker gray levels now show the greater frequency of occurrence. Further filtering is obtained in the present system by eliminating those 1-pixels which are falsely generated by the binarizer. This is accomplished by detecting the minimum point within the second major valley of the histogram curve of FIG. 5 (the first major valley occurs in the area containing the 0 occurrence of g) and by establishing an adaptive post threshold value, Tp, at this point and eliminating from consideration all pixels having a value above the established threshold. The remaining signals will be a more informative group of signals for data processing purposes.

Thus far it can be seen that the present system operates upon gray level signals by utilizing an annular ring binarizer ARB, which binarizes the gray coded signals as a function of the geometrical distribution of character pixels and then through an adaptive post thresholder, APT, establishes a threshold, Tp, which is adapted to the histogram of the extracted gray image to eliminate those pixels having a high probability of being specious.

The following defined terms will be useful in understanding the system to be described:

APT=Adaptive post thresholder
ARB=Annular ring binarizer
BI(X,Y)=Binarized image (two-level image)
EI(X,Y)=Extracted image gray level (multi-level image)
g(X,Y)=Original gray level image (0,1,2, ... 254,256)
PI(X,Y)=Post thresholded image (two-level image)
Tp=Post threshold value
$R_K$=An annular ring centered at (i,j), where 1,j=a running index with vertical coordinates, i, and horizontal coordinates, j. Four concentric and discrete annular rings $R_1$, $R_3$, $R_5$, and $R_7$, with a central pixel P, are shown in FIG. 3.
$S_K$=Set of pixels forming an annular ring $R_K$, centered at (i,j), and further defined as:

$$\{(m,n)\,|\,(k-\Delta) \leq \sqrt{(m-i)^2+(n-j)^2} \leq (k+\Delta)\}$$

$G_{RK}$=A vector of the gray levels of the labelled pixels in ring $R_K$ (see FIG. 3). Hence, for rings $R_1$, $R_3$, $R_5$, and $R_7$, the gray level vectors are defined as:

$$G_{R1} \triangleq \{g_{R1}(1), g_{R1}(2), \ldots, g_{R1}(8)\}$$

$$G_{R3} \triangleq \{g_{R3}(1), g_{R3}(2), \ldots, g_{R3}(24)\}$$

$$G_{R5} \triangleq \{g_{R5}(1), g_{R5}(2), \ldots, g_{R5}(40)\}$$

$$G_{R7} \triangleq \{g_{R7}(1), g_{R7}(2), \ldots, g_{R7}(56)\}$$

respectively.

$\bar{g}_p$=The weighted average gray level of the central pixel P and is further defined as:

$$\bar{g}_p = \tfrac{1}{2}g_p + \tfrac{1}{8}[g_{R1}(1)+g_{R1}(3)+g_{R1}(5)+g_{R1}(7)]$$

$\bar{g}_{RK}$=The average gray levels of annular rings $R_3$, $R_5$ and $R_7$ and is further defined as:

$$\bar{g}_{R3} = 1/24 \sum_{i=1}^{24} g_{R3}(i)$$

$$\bar{g}_{R5} = 1/40 \sum_{i=1}^{40} g_{R5}(i)$$

$$\bar{g}_{R7} = 1/56 \sum_{i=1}^{56} g_{R7}(i)$$

*$g_{RK}$=The minimum gray levels in rings $R_3$, $R_5$ and $R_7$ and is further defined as:

$$g_{R3} = g_{R3}(j); \quad g_{R3}(j) \leq g_{R3}(i)$$
$$i = 1, \ldots, 24$$
$$i \neq j$$

$$g_{R5} = g_{R5}(j); \quad g_{R5}(j) \leq g_{R5}(i)$$
$$i = 1, \ldots, 40$$
$$i \neq j$$

$$g_{R7} = g_{R7}(j); \quad g_{R7}(j) \leq g_{R7}(i)$$
$$i = 1, \ldots, 56$$
$$i \neq j$$

+$g_{RK}$=The maximum gray levels in rings $R_3$, $R_5$ and $R_7$ and is further defined as:

$$g_{R3} = g_{R3}(j); \quad g_{R3}(j) \geq g_{R3}(i)$$
$$i = 1, \ldots, 24$$
$$i \neq j$$

$$g_{R5} = g_{R5}(j); \quad g_{R5}(j) \geq g_{R5}(i)$$
$$i = 1, \ldots, 40$$
$$i \neq j$$

$$g_{R7} = g_{R7}(j); \quad g_{R7}(j) \geq g_{R7}(i)$$
$$i = 1, \ldots, 56$$
$$i \neq j$$

Figures 6, 7:
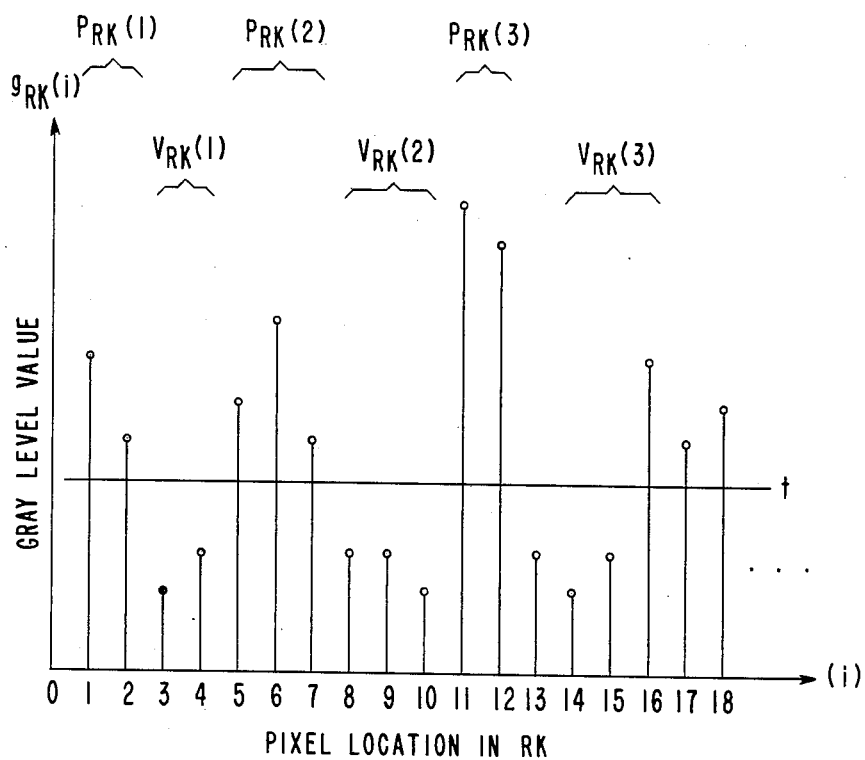
FIG. 6 is a chart illustrating an example of peaks and valleys for the gray level values of pixels adjacently positioned around an annular ring.
FIG. 7 is a chart illustrating positional identification of peaks and valleys occurring with respect to a defined threshold value.

$V_{RK}(j)$=A valley in the gray level vector $G_{RK}$ which is further defined as the jth connected set of pixels in $R_K$, for which their gray levels are smaller than a certain threshold value t (See FIG. 6). The position, width and lowest gray level of the valley is denoted as $\check{Q}_{RK}(j)$, $\check{W}_{RX}(j)$ and $\check{g}_{RK}(j)$, respectively.

$P_{RK}(i)$=Is a peak in the gray level vector $G_{RK}$ and is further defined as the ith connected set of pixels in $R_K$, for which their gray levels are greater than a certain threshold value t. (See FIG. 6). The position, width and highest gray level of the peak is denoted as $\hat{Q}_{RK}(i)$, $\hat{W}_{RK}(i)$ and $\hat{g}_{RK}(i)$ respectively.

neighbor=A line segment found in annular ring $R_K$ is the neighbor of a line segment found in annular ring $R_{K-2}$, if and only if, there is a pixel in the line segment in $R_K$ that is a neighbor of a pixel in the line segment in $R_{K-2}$. The neighborhood relationship of pixels for rings $R_7$ to $R_5$, and $R_5$ to $R_3$, are tabulated in the Table of FIGS. 8A and 8B.

$t_{RK}$=Threshold of ring RK.
$K_{RK}$=Relative brightness of ring RK.
$\bar{g}_v$=Average gray value of neighboring valleys.
$t_1$, and $t_2$=Light and dark pixel control parameters which are subjectively chosen to have a value of 20.
$H_s(i)$=Smoothed histogram.
$H_e(i)$=Extracted image histogram.

Referring to the chart of FIG. 6, the horizontal axis of the chart corresponds to the location, i, of a pixel in a ring $R_K$. The vertical axis corresponds to the gray level value $g_{RK}(i)$ of each of the pixels in the ring.

For the example shown, the gray level values form three valleys, $V_{RK}$, and three peaks, $P_{RK}$. The threshold level, t, determines the value of the gray level below which a valley is established or above which a peak is established. Using the chart of FIG. 6 the table of FIG. 7 can be generated. The table is generated by looking for the start position of the valleys $\hat{Q}_{RK}(j)$. The chart of FIG. 6 reveals by inspection that the valleys start at pixel positions 3, 8, and 13. The peaks, $\hat{Q}_{RK}(i)$, start at pixel positions 1, 5 and 12. The width of the valleys and the peaks correspond to the number of consecutive pixels having a gray level value below or above the threshold, t, respectively. The lowest and the highest gray level value $\hat{g}_{RK}(i)$ and $\hat{g}_{RK}(j)$ pixels for each group of valleys and peaks can be easily discerned by inspection of the chart of FIG. 6.

Referring to the neighborhood look up table of FIGS. 8A and 8B, the table establishes the neighbor pairs for consecutive rings, $R_7$ and $R_5$, and $R_5$ and $R_3$. The table was generated from the pixel matrix shown in FIG. 3. The outermost ring of FIG. 3 is $R_7$. Comparing some $R_7$ pixels to find their neighbors in the $R_5$ ring we find that $R_7$ pixels 27 and 28 each have the neighbor pixel 20 in ring $R_5$ and that the pixel 20 in $R_5$ is a neighbor to the pixel 12 in $R_3$. The table is used to establish if there is compliance with the neighborhood rule, i.e., a pixel P is deemed black if there is at least one pair of neighboring line segments that is found in two consecutive annular rings with radius $r_1$ and $r_2$, centered at P.

Figure 9:
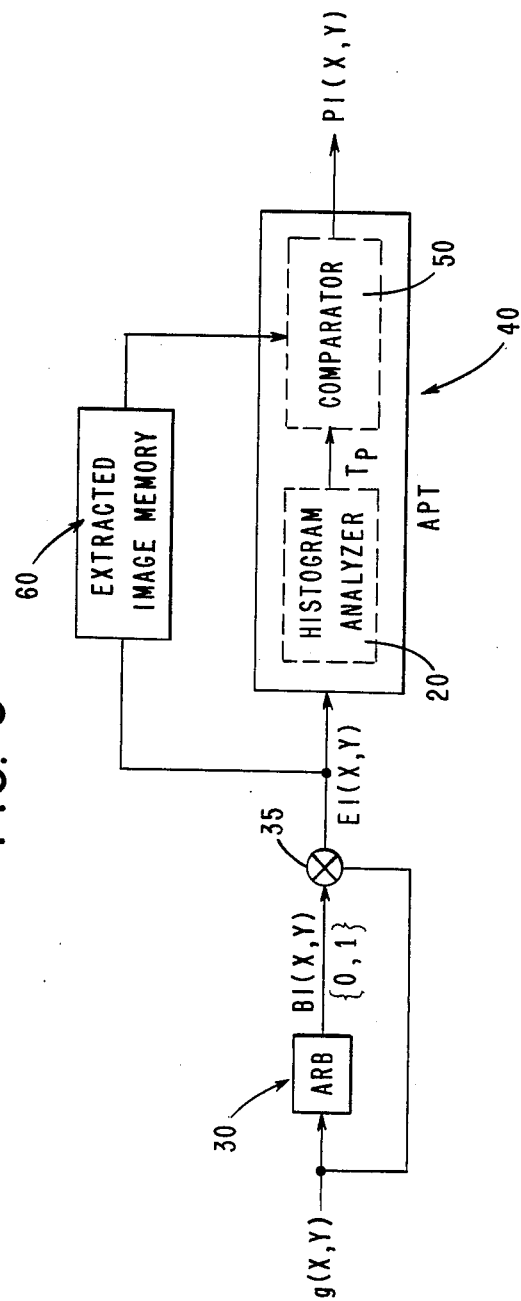
FIG. 9 is a block diagram of the preferred embodiment of the invention.

Referring to FIG. 9 the adaptive character extraction system is shown comprised of two major elements an annular ring binarizer, (ARB), 30 and an adaptive post-thresholder (APT) 40. The ARB, 30, receives an analog gray signal g(x,y) and provides at its output a binarized image signal BI(x,y). The analog gray signal can be derived from a scanner (front-end stage) of the type described in U.S. Pat. No. 4,523,231 entitled, "Method and System for Automatically Detecting Camera Picture Element Failure" by R. H. Therrien, which patent is assigned to NCR Canada Ltd-NCR Canada Ltee. The g(x,y) signal may be taken from the output of the ADC 27 shown in FIG. 1. Other types of scanners may also be used with the present invention. A multiplier 35 receives as inputs the signals g(x,y) and BI(x,y) and generates by multiplication (essentially a masking process) an extracted gray level image signal EI(x,y). The APT 40 is comprised of, a histogram analyzer 20 which receives as an input the signal EI(x,y) and which provides as an output a threshold signal Tp, and a comparator 50 which receives the output signal, Tp, from the histogram analyzer 20 and the output signal from an extracted image memory 60. The comparator 50 functions to compare the extracted image with the threshold Tp, and eliminates that portion of the extracted image which is above the threshold to provide at its output a post threshold image signal PI(x,y). The histogram analyzer 20 operates to accumulate the histogram, EI, and generates from the histogram the adaptive post threshold value, Tp. The extracted image memory 60 operates to receive and store input signal EI(x,y) until it is to be compared within the comparator.

Figure 10:
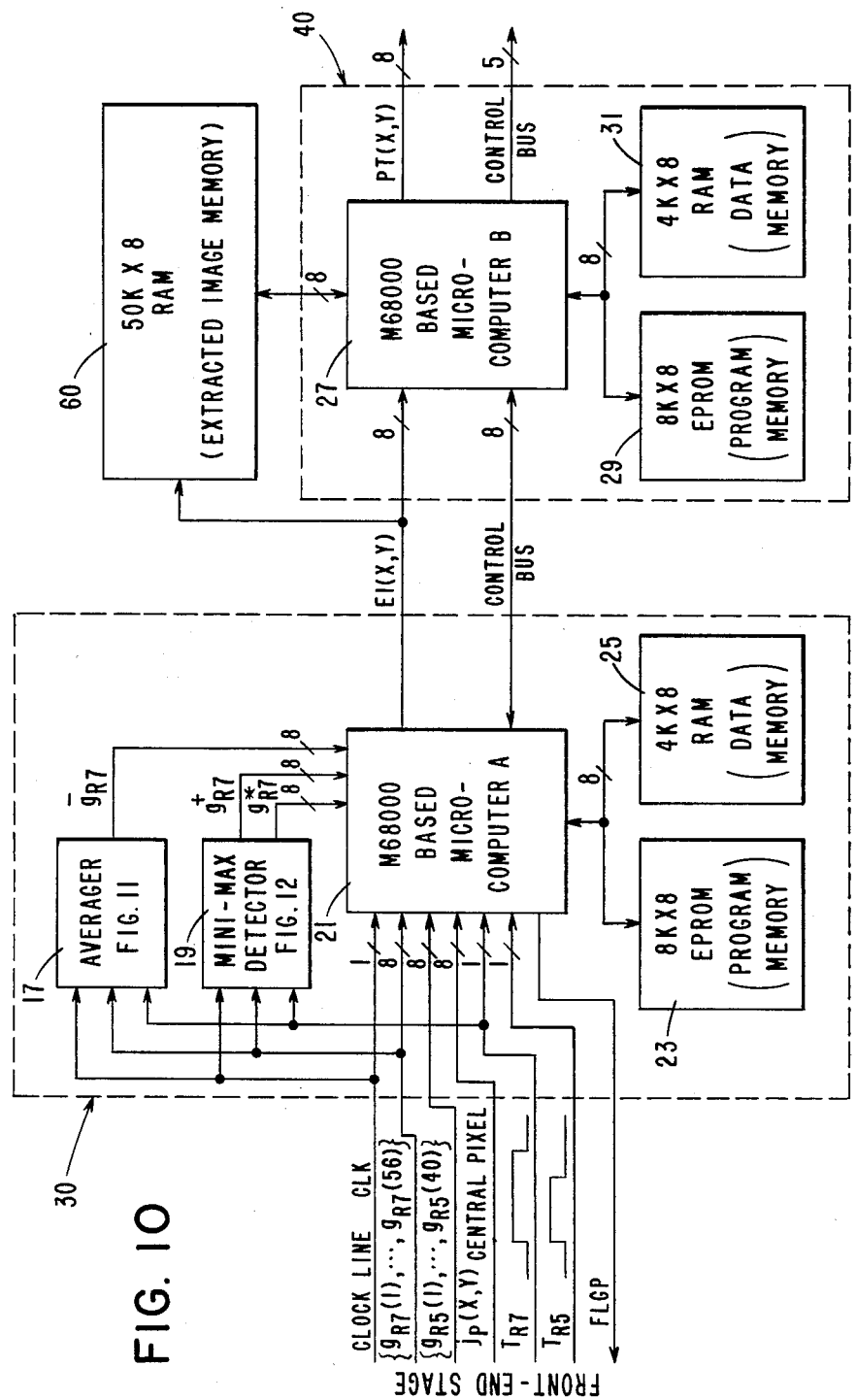
FIG. 10 is a more detailed block diagram of the preferred embodiment illustrated in FIG. 9.

Referring now to FIG. 10, the annular ring binarizer 30 is comprised of an M68000 based microcomputer 21, hereinafter called computer A. Memory is provided by an 8K×8 EPROM 23 and a 4K×8 RAM 25, each connected by an 8 conductor bus to computer A. Input lines for carrying, clock, gray level for ring and central pixels, flag, and TR signals are coupled to the inputs to computer A. An averager circuit 17 (detailed in FIG. 11) receives as inputs the signals, CLK, $TR_7$, and the gray level image levels for ring $R_7$, $\{g_{R7}(1), \ldots, g_{R7}(56)\}$, and provides as an output, to computer A, the averaged signal $\bar{g}_{R7}$. A mini-max detector 19 (detailed in FIG. 12) receives the same input signals as the averager 17 and provides, as outputs the max and min signals, $+g_{R7}$ and $*g_{R7}$, respectively, to the computer A. The computer A operates upon these signals to provide the output signal EI(x,y) to the input of the adaptive post-thresholder 40 and to the input of the extracted image memory 60.

The APT 40 is comprised of, an M6800 based microcomputer 27, hereinafter called computer B, and associated memory which is provided by an 8K×8 EPROM 29 and a 4K×8 RAM 31. EPROM 29 and RAM 31 communicate with the computer B over an 8-bit bus. The extracted image memory 60 is a 50K×8 RAM. The memory 60 interacts with the computer B over an 8-bit bus. The output from computer B, is the signal PI(x,y) appearing on an 8-bit output bus. An 8-bit control bus interfaces computer A with computer B to pass control signals therebetween to control the operation of the two computers in a manner well known to those persons skilled in the art. Computer B also provides control signals to peripheral devices (not shown) on a 5-bit control bus.

In operation, the gray level pixel data, $\{g_{R7}(1), g_{R7}(2), \ldots, g_{R7}(56)\}$, of annular ring $R_7$, referenced to the central pixel P, are transferred serially (8 bits at a time) to the averager 17, the mini-max detector 19, and the computer A when the data transfer control line signal $TR_7$ is high. In a similar fashion, the gray level pixel data, $\{g_{R5}(1), g_{R5}(2), \ldots, g_{R5}(40)\}$ of annular ring $R_5$ are transferred serially to the computer A when the data transfer control line signal $T_{R5}$ is high.

Figure 11:
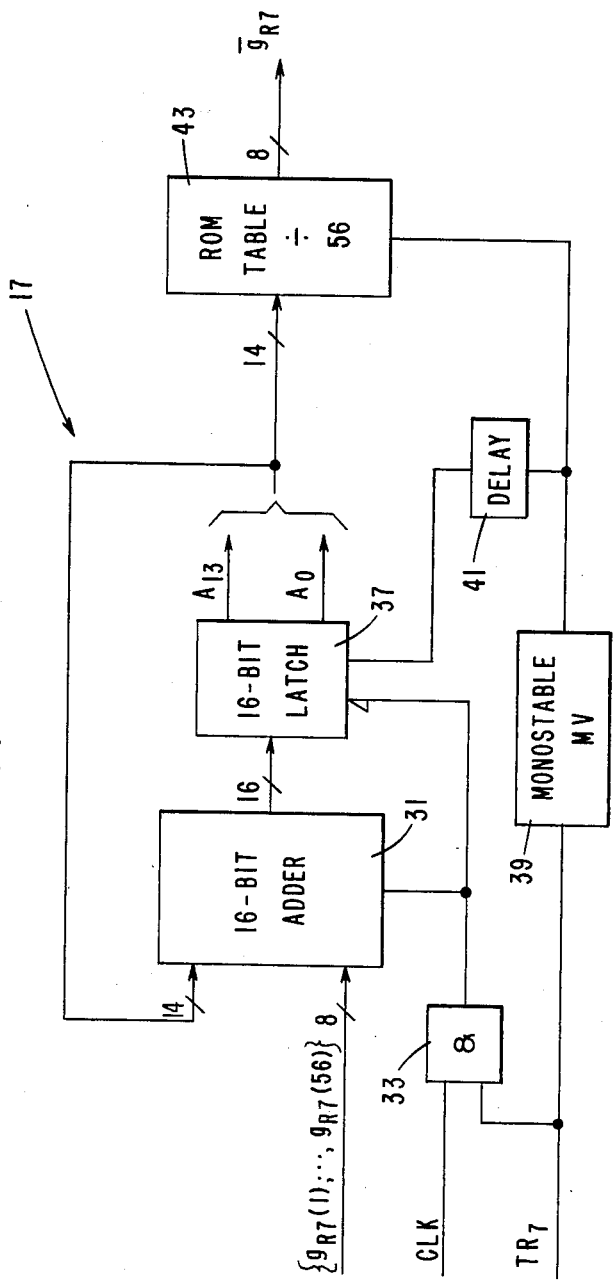
FIG. 11 is a detailed block diagram of an averager used in the FIG. 10 embodiment.

Referring to FIG. 11 within the averager 17 there is a sequential 16-bit adder 31 and a 16 bit latch 37 which operate to continually sum the gray level pixel data $\{g_{R7}(1), g_{R7}(2), \ldots, g_{R7}(56)\}$ as they are serially transferred 8-bits at a time. The summing operation is synchronized to the positive leading edge of the clock signal CLK. The clock signal, CLK, is gated to the latch 37 by an AND gate 33 under gating control of the signal TR7. At the completion of their transfer, the accumulated sum is then divided by 56 in a ROM Table 43 to form the average gray level value $\bar{g}_{R7}$ of annular ring $R_7$, which value will then be fed, as an input, to the Micro-Computer A for further processing. A monostable multivibrator 39 and a delay circuit 41 operate to delay (hold) the last sum at the outputs of the latch 37 until the ROM Table 43 is enabled, by the signal RENB from the multivibrator 39, and is able to address or load the outputs from the latch 37.

The 16-bit adder 31 is comprised of four cascaded 4 bit adders each having the industry part no. SN54LS283 or its equivalent. As is well known, each adder has two banks of four inputs each. Two of the adders have one bank of four inputs connected to the 8-bit bus carrying the signals, $\{g_{R7}(1), \ldots, g_{R7}(56)\}$. Each signal may have a gray value of from 0 to 255. An 8-bit line provides the capability of communicating $2^8$ or 256 binary values. The other bank of inputs, for each of the four 4-bit adders is connected to receive the outputs from the 16-bit latch 37. The highest sum that the adder 31 will ever have to may count is 56 pixels each having a gray level of 255 (with 0 counting as 1 the max gray level would be 255). The maximum count that adder 31 would have to handle would thus be $56 \times 256 = 14,336$. A fourteen bit line system can handle a count of $2^{14} = 16,384$ which exceeds the maximum actual count by approximately 2,000. A fourteen bit adder and latch are therefore more than adequate to implement the invention. The 16-bit latch 37, which may be an SN54S281 or its equivalent, in operation latches the fourteen bit count from adder 31 and makes the output available on its fourteen output lines labeled $A_0$-$A_{13}$. The ROM 43, which may be an Intel 3628A, is addressed at one address corresponding to the added value of $\{g_{R7}(1), \ldots, g_{R7}(56)\}$ which as previously stated may have a value between 0 and 14,336. The ROM is programmed such that at each address in memory there is stored a value which is the address number divided by 56. This effectively performs a division function. The number 56 is chosen because, the maximum count 14,336 when divided by 56 results in a maximum value of 256 which is, $2^8$, and which may be communicated over an 8-bit bus. The 8-bit output value $\bar{g}_{R7}$ from the ROM 43 is directed to an input to the computer A.

Figure 12:
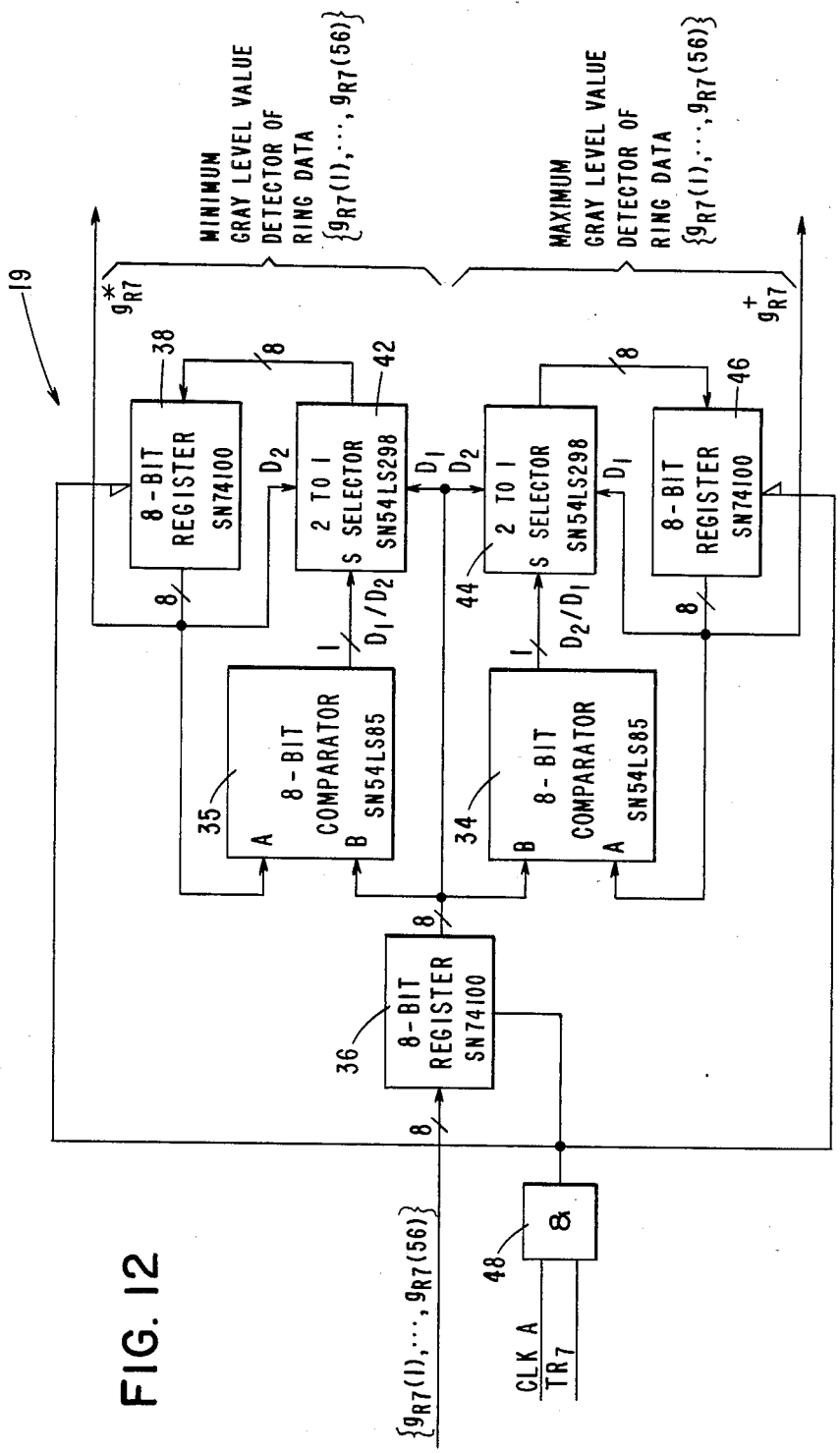
FIG. 12 is a detailed block diagram of a minmax detector used in the FIG. 10 embodiment.
Figure 13A:
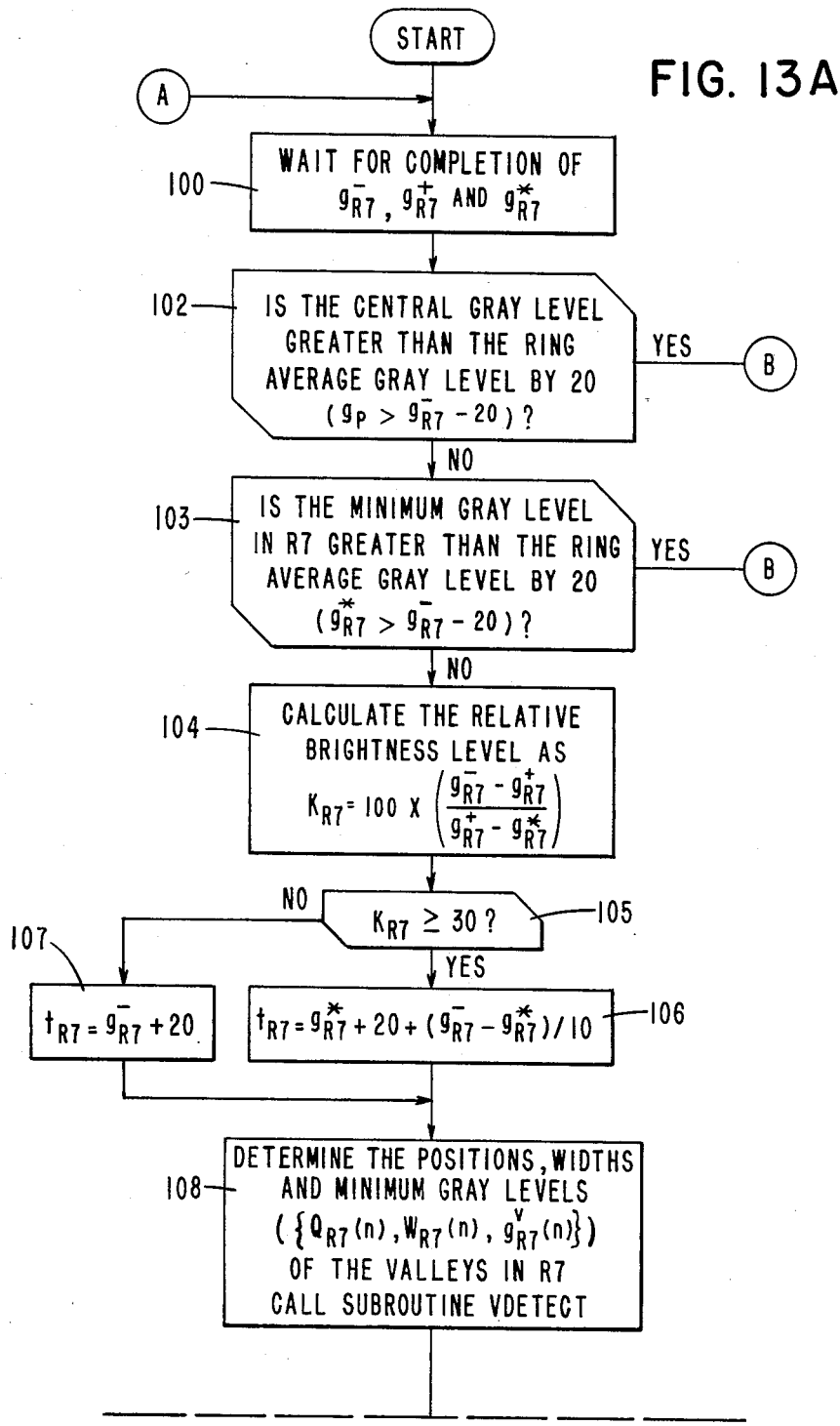
FIGS. 13A through 13D illustrate in flow chart form the operation of the annular ring binarizer.
Figure 13B:
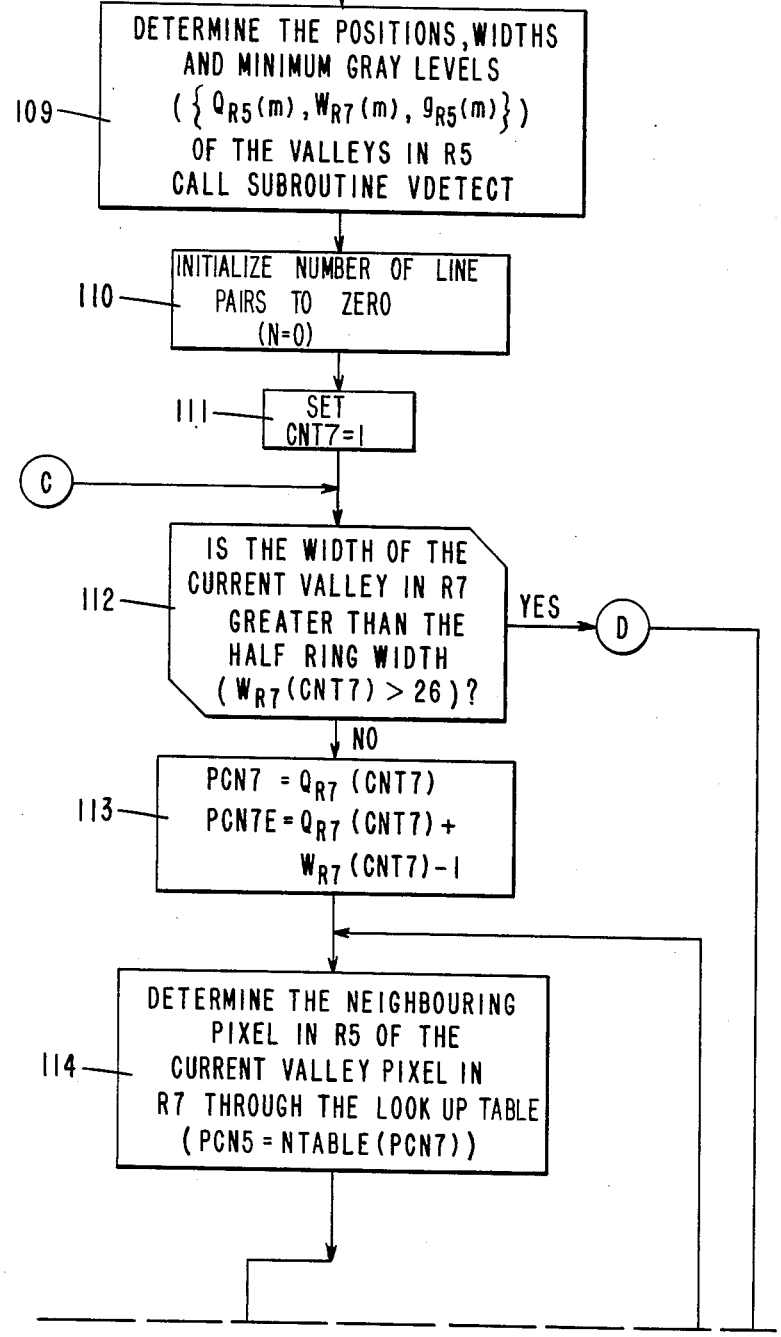
Figure 13C:
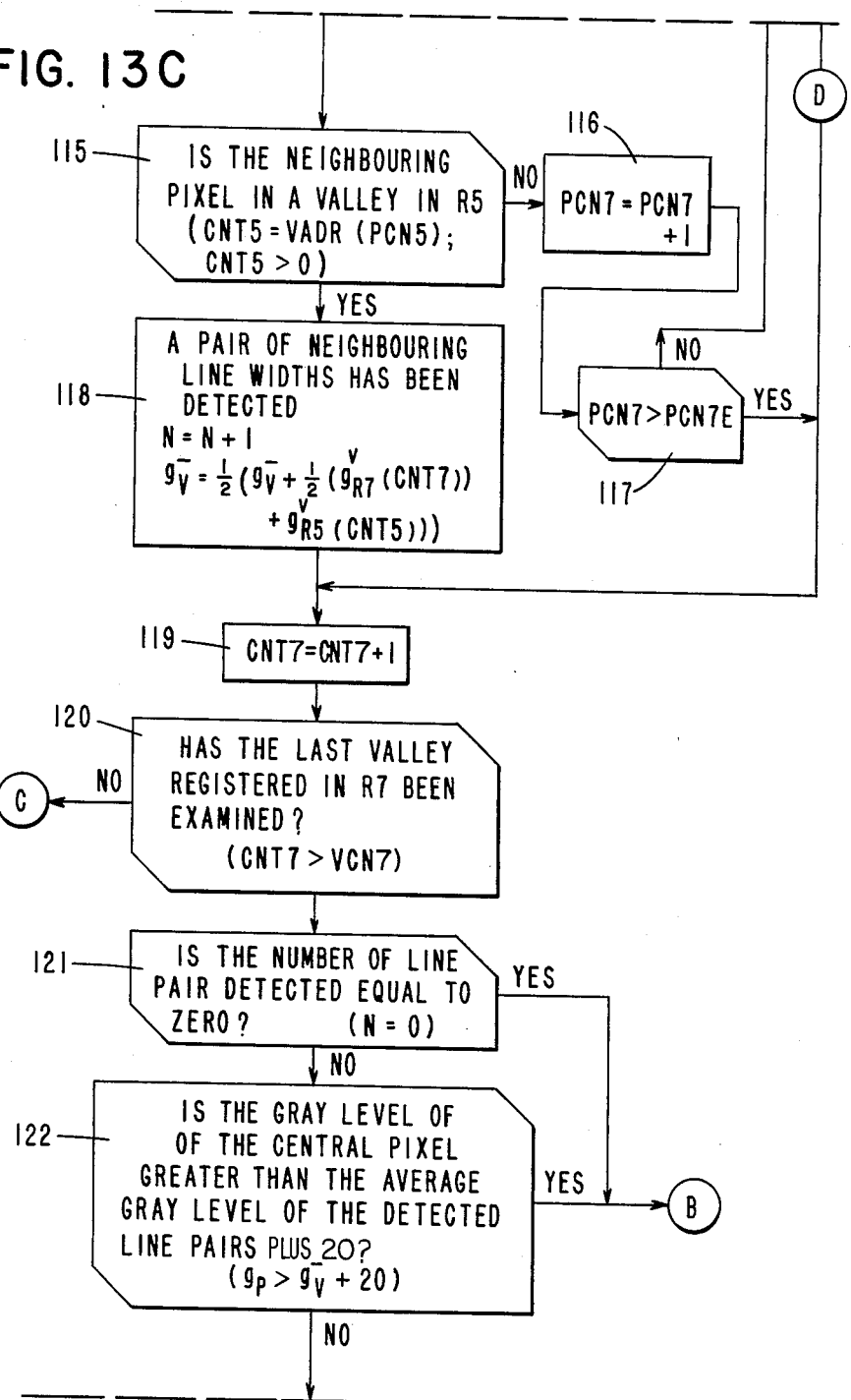
Figure 13D:
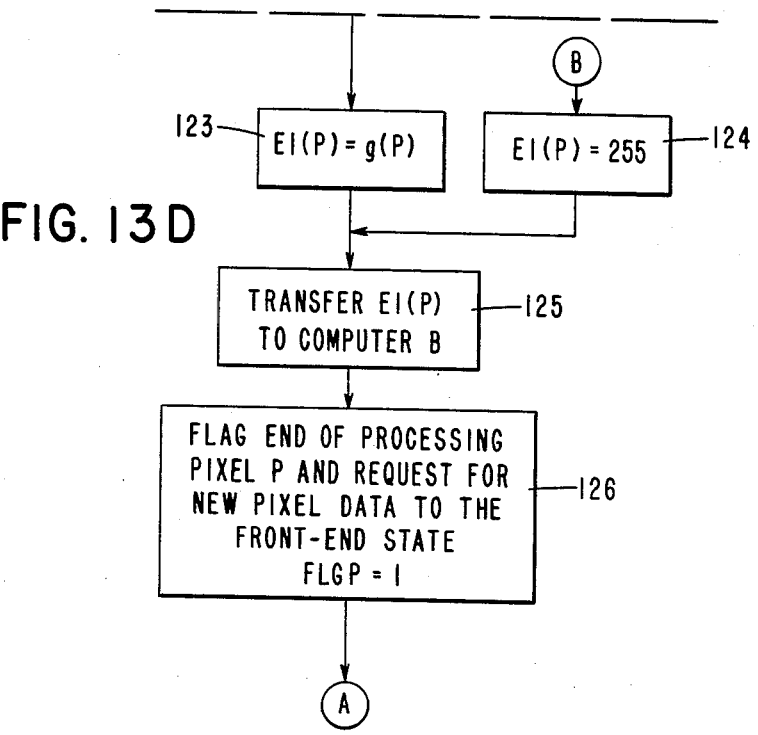

Referring to FIG. 12 two feedback comparator stages in the mini-max detector 19 (the first comprised of an 8-bit comparator 32, an 8-bit register 38 and a 2 to 1 selector 42, and the second comprised of an 8-bit comparator 34, an 8-bit register 46 and a 2 to 1 selector 44) operate simultaneously on the serially incoming gray level pixel data $\{g_{R7}(1), \ldots, g_{R7}(56)\}$ to determine the minimum gray level pixel value $*g_{R7}$ and the maximum gray level pixel value $+g_{R7}$ in annular ring $R_7$. The resultant minimum gray level pixel value and the maximum gray level value are then fed to micro-computer A.

In operation, the 8-bit register 36 buffers, in turn, each of the values $g_{R7}(i)$ to comparator 32 and 34 and to the $D_1$ and the $D_2$ input of the 2-to-1 selectors 42 and 44 respectively. Each comparator compares the signals on its B labeled input against the signals on its A labeled input. Comparator 32 is looking for the lowest gray level value therefore it is questioning whether the value on its B input is less than the value on its A input. If so, it selects the B input value ($D_1$ input) through selector 42 and passes that gray level value to register 38 to be stored therein as the minimum gray level signal so far. If not, it selects the A value ($D_2$ input) and passes the value back to the input of register 38 wherein it will again appear on the A input of comparator 32 ready for the next comparison. At the end of examining 56 pixel gray levels, for ring $R_7$, the detector will make available, at the output of register 38, the lowest value found, which is $*g_{R7}$.

Operating in a similar manner comparator 34 is questioning whether the gray level value on its B labeled input is greater than the gray level value on its A labeled input. If so, the selector 44 selects the signal on its $D_2$ input and passes the signal to register 46 replacing any previous maximum signal that may be in register 46. If the gray level value on the B input is not greater than the gray level value on the A input the comparator so indicates and selector 44 selects the $D_1$ input and directs that input to be re-stored in register 46 as the maximum gray level value $+g_{R7}$ found so far. At the end of comparing 56 values for Ring $R_7$ the maximum and the minimum values will be available at the terminals labeled $+g_{R7}$ and $*g_{R7}$. The AND gate 48 controls the clocking of the various blocks under gating control of the signal $T_{R7}$. In the preferred embodiment of the invention the eight bit registers 36, 38 and 46 were formed from SN74100 devices, the 2 to 1 selectors 42 and 44 were formed from quad 2 port register SN54LS298 devices, and the 8-bit comparators 32 and 34 were formed from SN54LS85 devices.

Operating in a synchronous manner, the microcomputer A will execute the following procedures immediately after the average gray level $\bar{g}_{R7}$, the minimum gray level $*g_{R7}$, and the maximum gray level value $+g_{R7}$ of annular ring $R_7$ are available.

Procedure 1: If $(g_p > \bar{g}_{R7} - 20)$ or $(*g_{R7} > \bar{g}_{R7} - 20)$ then go to Procedure 6 otherwise go to procedure 2

Procedure 2: Determine the relative brightness factor $K_{R7}$ of annular ring $R_7$ as;

$$K_{R7} = 100 \times \frac{(\bar{g}_{R7} - *g_{R7})}{+g_{R7} - *g_{R7}}$$

Determine the ring threshold $t_{R7}$ of annular ring $R_7$ as $$t_{R7} = \begin{cases} \bar{g}_{R7} + 20 + (+g_{R7} - \bar{g}_{R7})/10 & \text{for } K_{R7} \geq 30 \\ \bar{g}_{R7} + 20 & \text{for } K_{R7} < 30, \end{cases}$$

go to Procedure 3

Procedure 3: Determine;
  (a) the start positions $\{Q_{R5}(i)\}$ and $\{Q_{R7}(j)\}$
  (b) the widths $\{W_{R5}(i)\}$ and $\{W_{R7}(j)\}$ of all the valleys $\{V_{R5}(i)\}$ and $\{V_{R7}(j)\}$ of annular rings $R_5$ and $R_7$ respectively. go to Procedure 4.

Procedure 4: Eliminate all the intervals in $\{I_{R7}(j)\}$ for;
  (a) those whose widths are larger than 26, or
  (b) those that do not have a neighboring interval in $R_5$ according to the Neighborhood rule (see the look-up table of (FIG. 8). The number of the remaining valleys (denoted here as N) which pass tests (a) and (b) are designated as the number of valid pairs of line segments (or valleys). Next, the average gray level (denoted here as $g_v$) of the valid pairs of neighboring line segments is determined. go to Procedure 5

Procedure 5: If $N = 0$, or $g_p > \bar{g}_v + 20$, then go to Procedure 6 else the gray level value of the central pixel P now in the extracted image (EI) is taken as $EI(P) = g_p$ go to Procedure 7

Procedure 6: The gray level value of the central pixel P now in the extracted image (EI) is taken as $EI(P) = 255$ go to Procedure 7

Procedure 7: Transfer the extracted gray level pixel value $EI(P)$ to micro-computer B and to the extracted image memory 60 for the next stage of processing. If the data transfer control line $T_{R7}$ is low, then wait, else $P = P + 1$ and go to Procedure 1 for micro-computer B Operating in synchronism with micro-computer A, micro-computer B reads in each $EI(P)$ and generates a gray level histogram $H(k)$, $k = 0, 1, \ldots, 255$ of the extracted image EI. At the end of the complete transfer of EI, micro-computer B is flagged by micro-computer A to perform the following (adaptive post-thresholding):

Procedure 1: Smooth the gray level histogram H(k), k=0, 1, ..., 255 and obtain $$H_s(i) = (H(i) + < (H(i-2) + H(i-1) + H(i+1) + H(i+2))$$

i=3, 4, ..., 252 and $$H_s(1) = H(1), H_s(2) = H(2), H_s(3) = H(3),$$

$$H_s(253) = H(253), H_s(254) = H(254), H_s(255) = H(255),$$

Set the initial threshold, t=75

Procedure 2: Threshold the smoothed histogram $H_s(i)$ with the threshold value t, and obtain the positions $\{\hat{Q}_{Hs}(j), \hat{Q}_{Hs}(i)\}$ and the widths $\{\hat{W}_{Hs}(i), \hat{W}_{Hs}(j)\}$ of all the intervals. Look for a second pair of a major valley and peak with the following test:

$$\hat{W}_{Hs}(j) \geq 10 \; 2 \leq j$$

and $$\hat{W}_{Hs}(i) \geq 10 \; j \leq i$$

If the test succeeds, then go to Procedure 3 otherwise adjust the threshold, t=t−5. If t≠15, then go to Procedure 2 else set the adaptive post threshold value $T_p=250$ and go to Procedure 4

Procedure 4: Generate the post threshold image from the extracted image stored in the extracted image memory as;

$$PI(x,y) = \begin{cases} 0, & EI(x,y) > T_p \\ 1, & EI(x,y) \leq T_p \end{cases}$$

The general procedures that have been set forth are carried out by the micro-computer following the specific flow charts and the associated descriptions to follow:

Referring to the annular ring binarizer flow chart of FIGS. 13a through 13d, in block 100 the annular ring binarizer (ARB) 30 is receiving the individual pixel gray values for the ring $R_7$ and is computing the average gray value $\bar{g}_{R7}$ of ring $R_7$, the maximum gray level $^+g_{R7}$, and the minimum gray level $^*g_{R7}$. The ARB is also monitoring for the negative transition edge of the signal TR7. Upon the occurrence of the negative transition of TR7 the program will move to block 102. Block 102 questions whether the gray level of the central pixel P is greater than the ring average gray level $\bar{g}_{R7}$ minus 20. If the answer is "yes" then the program moves to block 124. If the answer is "no" the program moves to block 103. Block 103 questions whether the minimum gray ring average $^*g_{R7}$ is greater than the ring average gray level $\bar{g}_{R7}$ by 20? If the answer is "yes" the program goes to block 124. If the answer is "no" the program goes to block 104. The value 20, of blocks 102 and 103, is a selected gray level difference in relation to contrast. Assuming that the answer is "no", block 104 will calculate the relative brightness factor $K_{R7}$. The relative brightness is a comparison of the average valve against the total range of brightness within the ring $R_7$.

In block 105 the percentage magnitude of $K_{R7}$ is compared against the percentage 30. If the value of $K_{R7}$ is greater than 30 the program moves to block 106. If the value of $K_{R7}$ is less than 30 the program moves to block 107, where the value $t_{R7}$ is established as the value $\bar{g}_{R7}+20$. If the program moved to block 106 the value of $t_{R7}$ is made equal to the minimum gray level $^*g_{R7}+20$ plus a noise compensated factor. With the value $t_{R7}$ computed the program moves to block 108 to determine the positions widths, and minimum gray levels of each valley. At this point the subroutine VDETECT is activated. The subroutine VDETECT is set forth in FIGS. 14A through 14C and will be described later in this specification. When the values called for in block 108 have been computed the program increments to block 109 wherein the aforementioned items are computed for the valleys in $R_5$ and the subroutine VDETECT is again called.

In block 110, the number of line pairs N is set to zero and in block 111 the value CNT7, corresponding to the pixel positions in ring $R_7$, is set to 1. The program will then move to block 112 where the question, Is the width of the current valley in R7 greater than the half-ring width (the half-ring width for $R_7$ is 26)? If the answer is "yes" the program jumps to block 119. If the answer is "no" it means that the width of the valley is equivalent to a line width that is actually smaller than 26 and the program moves to block 113 and sets the pixel position count PCN7 in ring $R_7$ equal to $Q_{R7}$ (CNT7). To accomplish this the program sets CNT7, the pixel position counter, equal to the starting position count of the current valley then PCN7E is set equal to the ending position of the current valley by adding the width of the current valley to the starting position count. The program then moves to block 114 and by use of the look-up table of FIG. 8 determines the neighboring pixel in $R_5$ corresponding to the current valley pixel in $R_7$.

The program moves to block 115 to question, whether the neighboring pixel is in a valley in $R_5$. If the answer is "no" the program moves to block 116. If the answer is "yes" the program moves to block 118. With a "no" answer the pixel positional counter PCN7 will be incremented by 1 and move to the next pixel in the valley. At this point the program checks, through block 117, to see if the PCN7 has exceeded the width of the current valley. If it has then testing on the current valley is then terminated and the program moves to the next valley and block 119. If the answer is "no" the program goes back to block 114 and looks through the look-up table for the neighbor position corresponding to the present position in $R_7$. This will continue until it is determined that the addressed valley in $R_5$ in part belongs to a valley in $R_7$, that is, that a pair of neighboring lines has been detected and the following operations can occur. With a "yes" response from block 117 the program moves to block 119 where the CNT count is incremented by 1 and the program moves to block 120 to determine if the last valley in $R_7$ has been examined.

The branches from blocks 102 and 103 that go to block 124 traverse through blocks 124, 125 and 126 in the manner just described for the output from block 122.

Figure 14A:
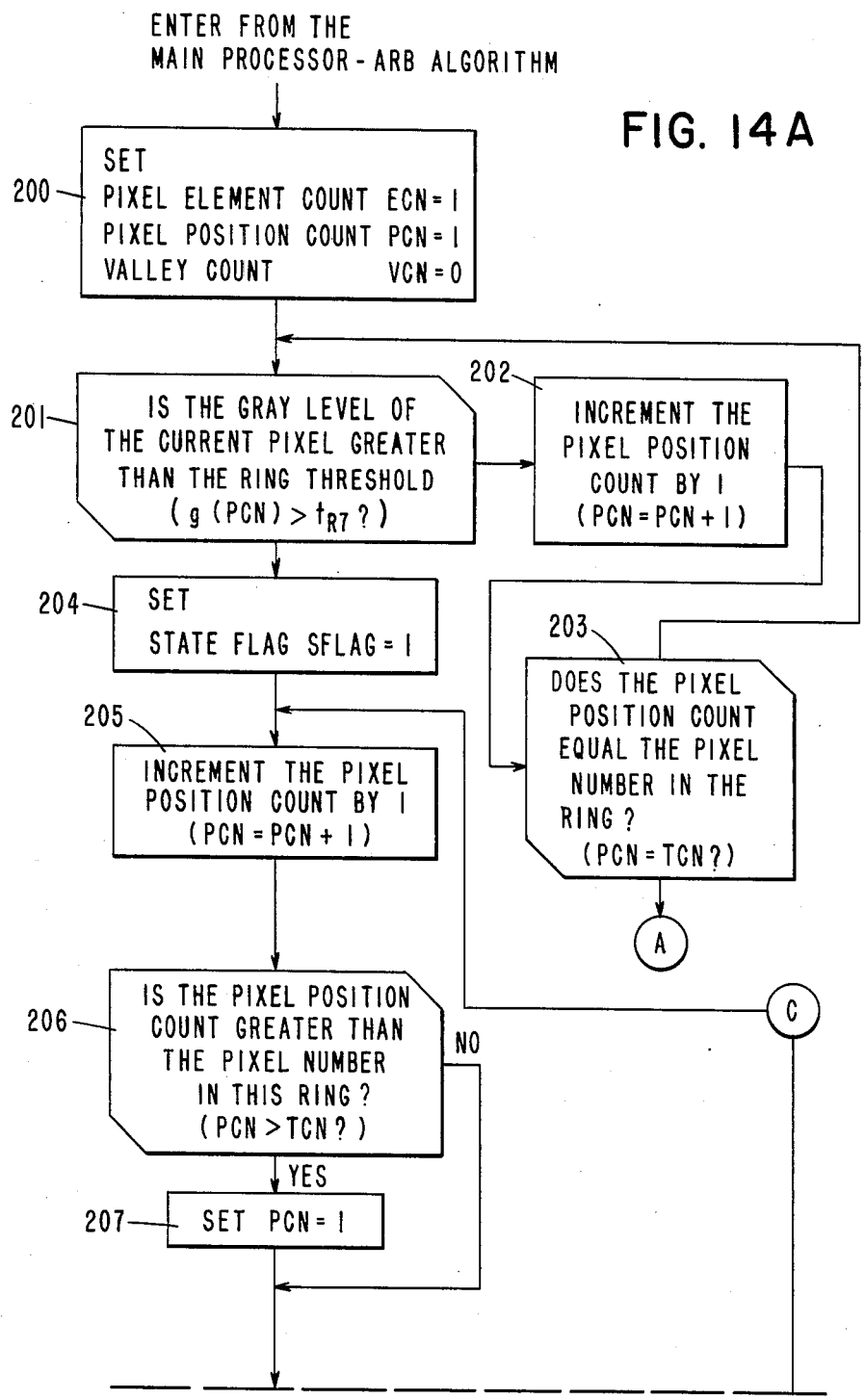
FIGS. 14A through 14C illustrate in flow chart form a subroutine used in the preferred embodiment.
Figure 14B:
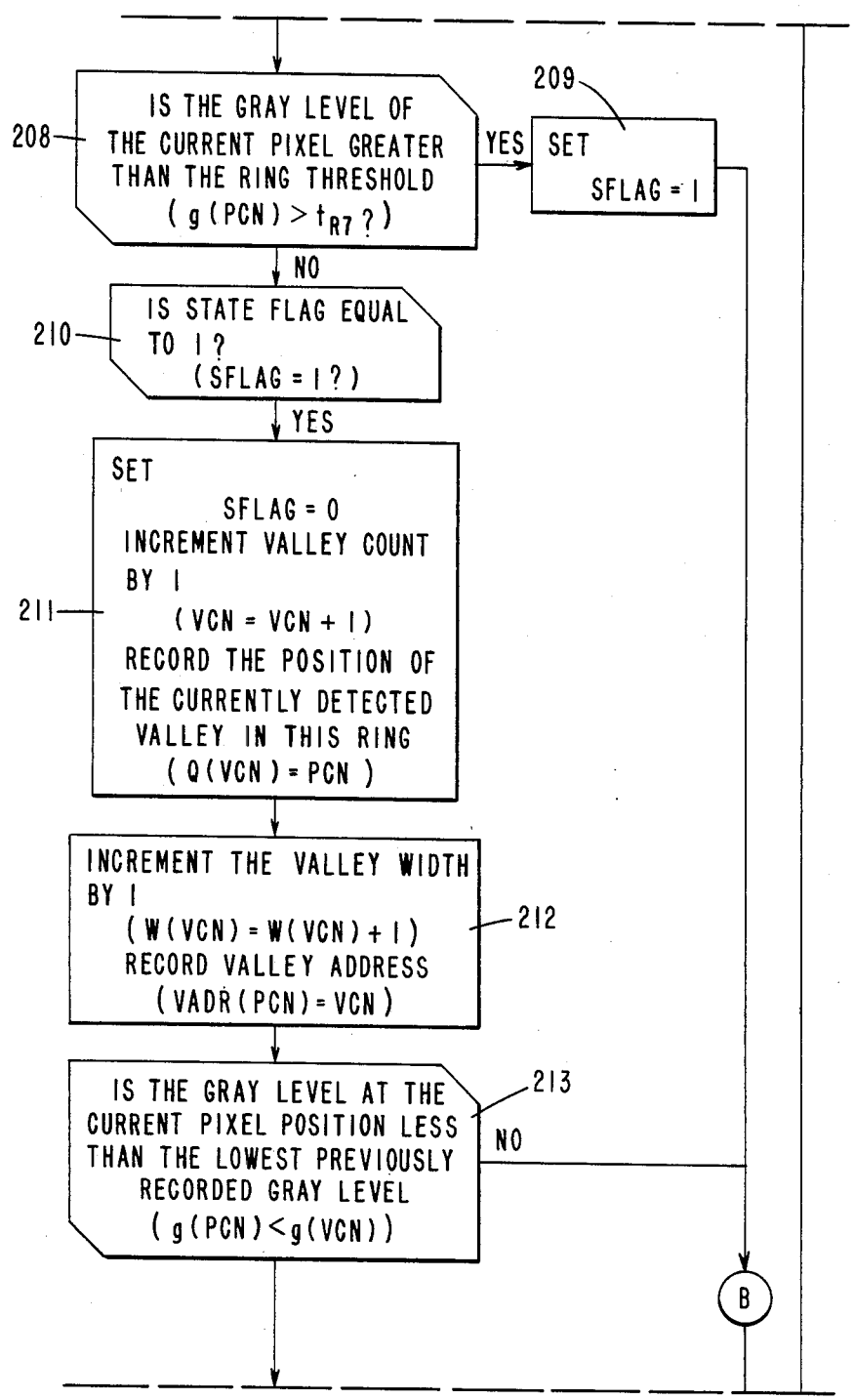
Figure 14C:
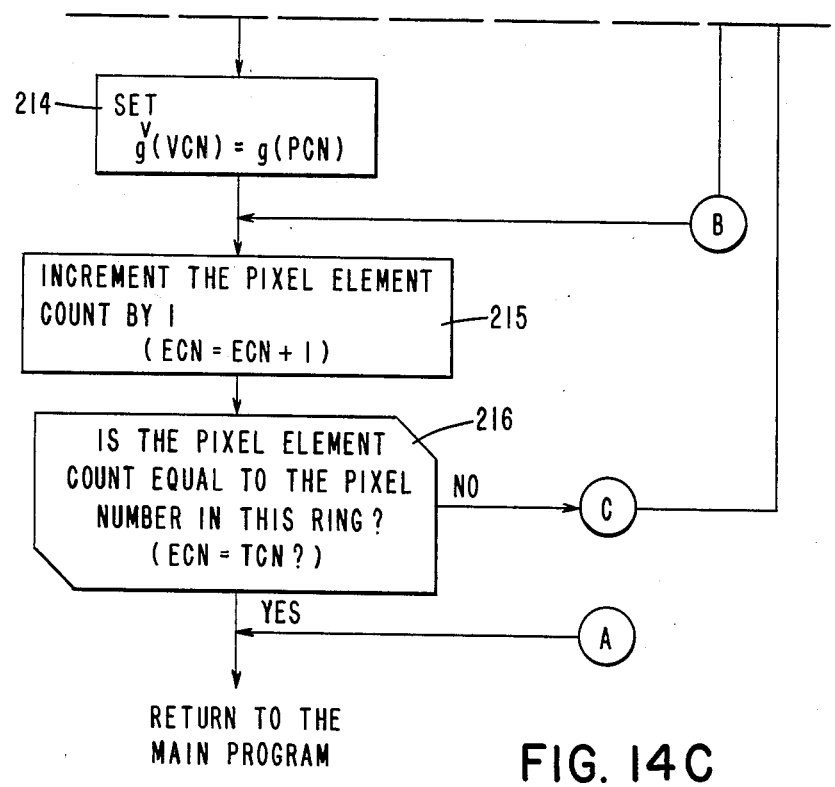

Referring now to FIGS. 14A, 14B and 14C, wherein the flow chart for the subroutine VDETECT is shown, for reference the ARB program of FIGS. 13A–13D when executing blocks 108 and 109 call for the subroute "VDETECT". The subroutine is entered through block 200 where initial conditions are set i.e., the pixel element count ECN is set to 1, the pixel position count PCN is set to 1, and the valley count VCN is set to 0. When set the current pixel will be directed to block 201 and tested to determine if its gray level is greater than the ring threshold, $t_{R7}$. If it is not greater the program moves to block 202 and the pixel position count PCN is incremented by 1. If the gray level is greater the program moves to block 204 and the state flag SFLAG is set to 1. The program then moves to block 205, which increments the pixel position count by 1 and advances the program to block 206. Block 206 questions whether the pixel position count is greater than the pixel number for the ring. If the answer is "yes" the program, through block 207, sets PCN equal to 1 and advances to block 208. In block 208 if the gray level of the current pixel is greater than the ring threshold the program, through block 209, sets the SFLAG equal to 1. If it is not greater than the ring threshold the program advances to block 210. If the state flag SFLAG has been set, block 211 sets the flag equal to 0 and advances the valley increment count VCN by 1 and records the position of the currently detected valley in this ring. The program then advances to block 212 where the valley width, W(VCN) is incremented by 1 and the valley address VADR is recorded. The program then advances to block 213 where the gray level at the current position is compared against the previously lowest recorded gray level for other positions to determine if it is greater or less than. If it is not greater the program advances to block 214 where the present gray level is set equal to the previously recorded lowest gray level and the program advances to block 215. In block 215 the pixel element count ECN is incremented by 1 and the program is advanced to block 216. Block 216 compares the element count with the pixel number to determine if they are equal. If they are not the program branches back to block 205 to increment the pixel position count PCN by one. If the count is equal the subroutine ends and then returns to the main program.

Figure 15A:
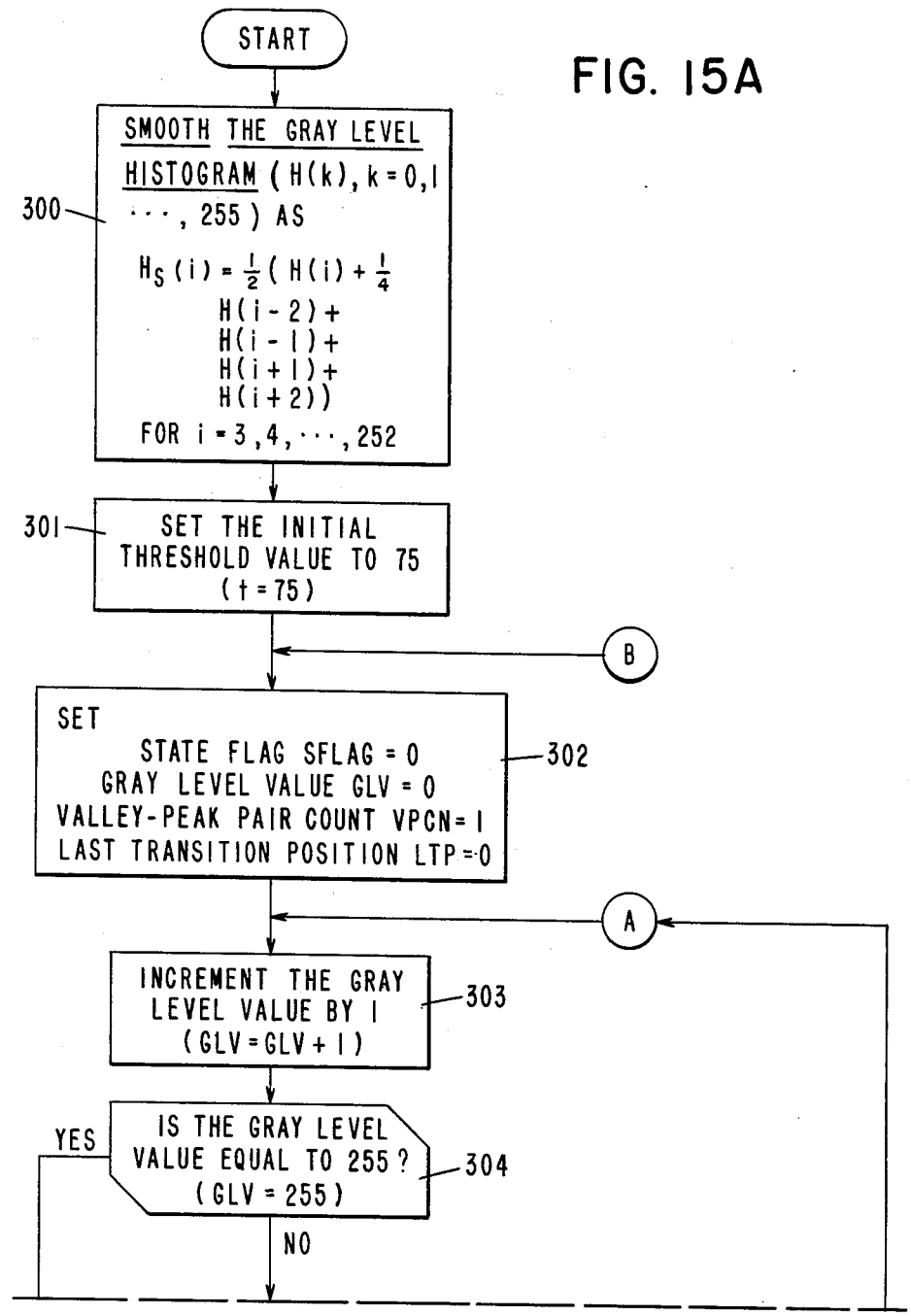
FIGS. 15A through 15C illustrate in flow chart form the operation of the adaptive post-thresholding.
Figure 15B:
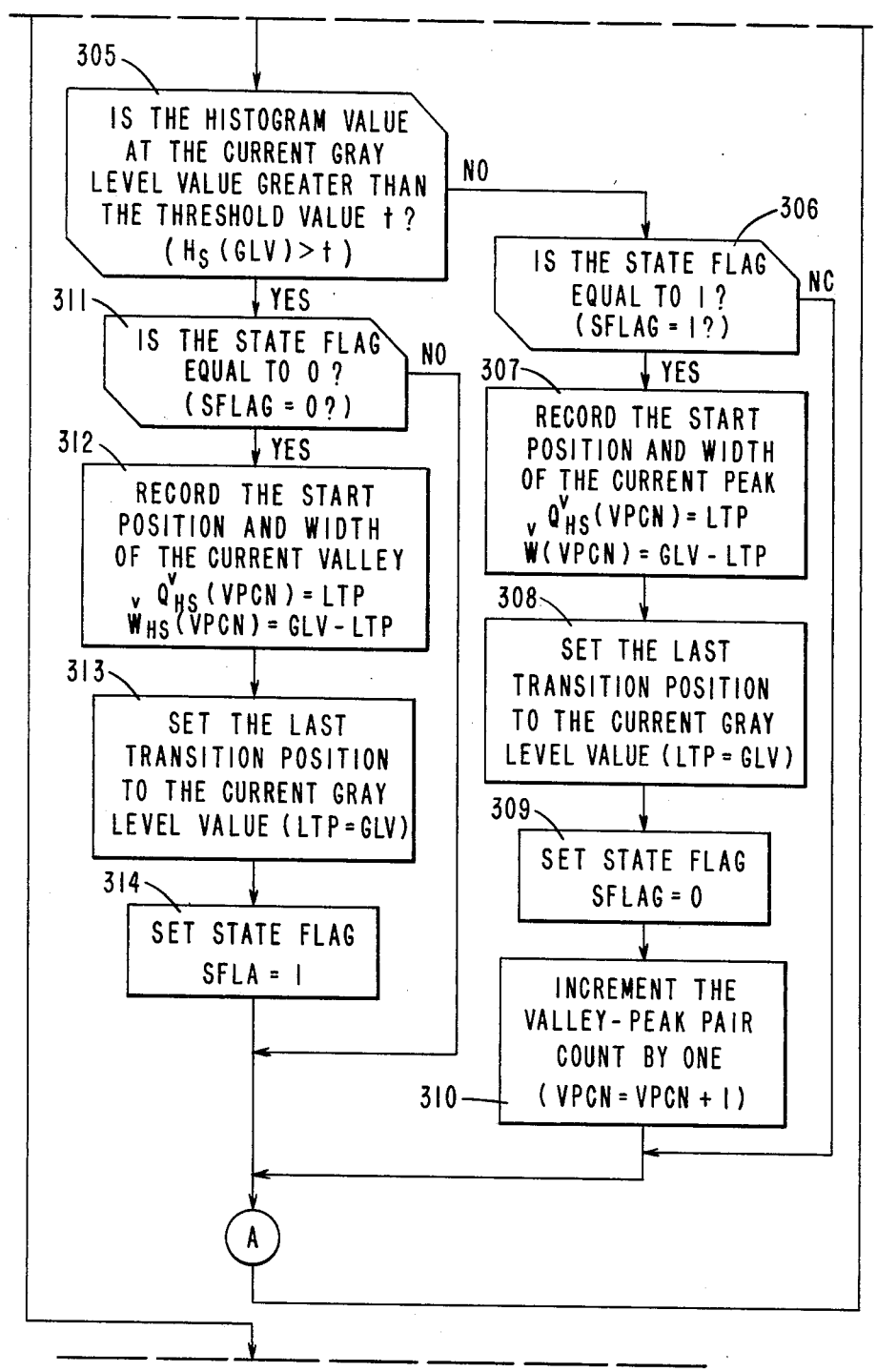
Figure 15C:
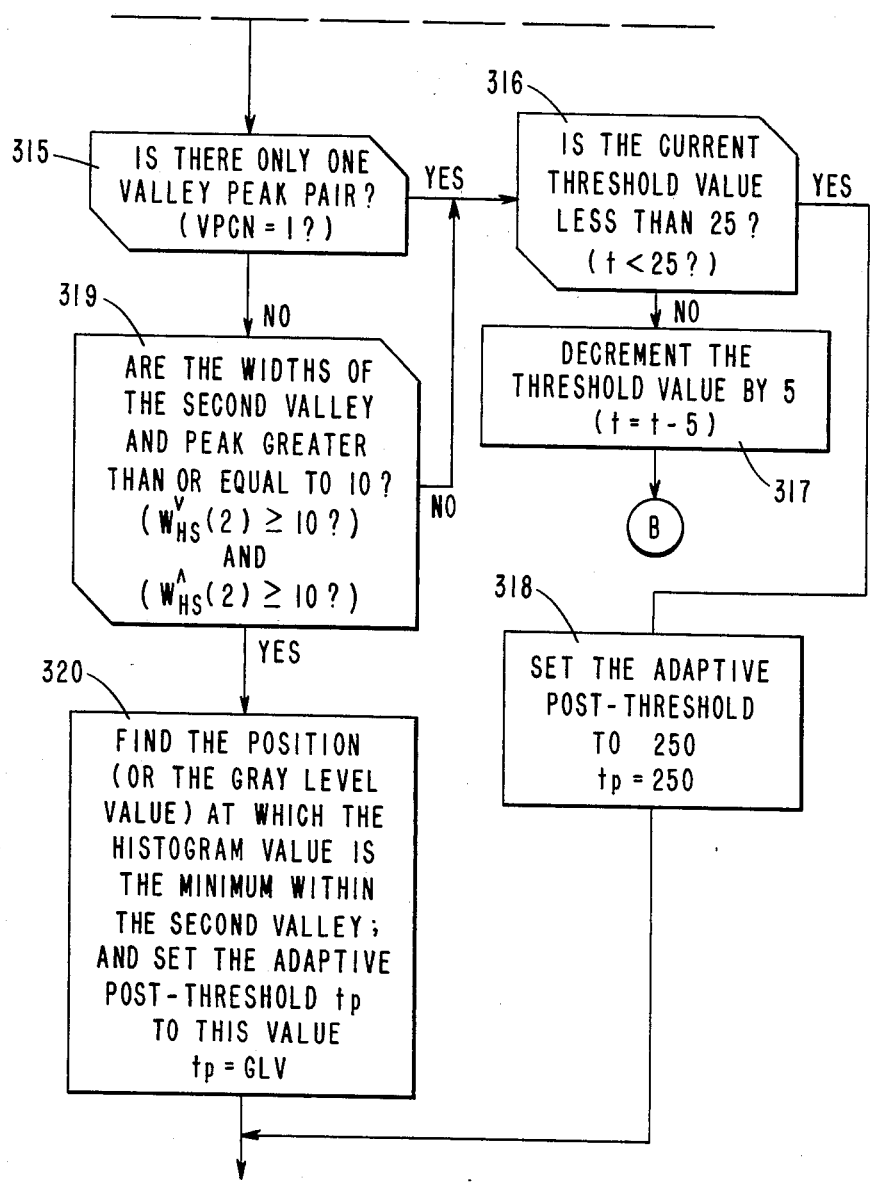

Referring to FIGS. 15A–15C wherein is shown the flow diagrams of the adaptive post-thresholding process of the present invention. The operation reflected by block 300 is a smoothing of the gray level signal which is accomplished by computing $H_s(i)$ for the values $i=3, 4, \ldots, 252$ using the given formula.

With the values of $H_s(i)$ computed the program advances to block 301 wherein the threshold value t is set initially to 75. The program then advances to block 302 where the state flag SFLAG is set to 0, the gray level value GLV is set to 0, the valley-peak pair count, VPCN is set to 1, and the last transition position LTP is set to zero. In block 303 the gray level value GLV is incremented by 1 and the program advances to block 304. Block 304 checks to determine if the gray level value is equal to 255, if the answer is "yes" the program branches to block 315. If the answer is "no" the program advances to block 305. In block 305, if the histogram value is greater than the threshold value t the program advances to block 311, if it is not the program branches to block 306.

In block 311 if the state flag is equal to 0 the program advances to block 312, if not the program branches back to block 303. In block 312 a record is made of the start position and the width of the current valley. Block 313 sets the last transitional point LTP to the current gray level value. Block 314 sets the state flag to 1 and advances the program to block 303. Referring back to the branch from block 305 to block 306, if the state flag is equal to 1 the program moves to block 307, if not the program branches to block 303. Block 307 records the width of the current peak and advances the program to block 308 wherein the last transition position is set equal to the current gray level value. Block 309 then sets the state flag equal to zero. The program, through block 310, then increments the valley peak pair count VPCN by one and advances the program back to block 303. Referring back to block 304, if the gray level value is equal to 255 the program advances to block 315. If there is only one valley peak pair the program branches to block 316. If there is more than one valley peak pair the program branches to block 319. The program in block 319 considers whether the widths of the second valley and peak are greater than or equal to 10. If not greater than 10 the program branches to block 316. If it is greater than 10 the program advances to block 320 wherein the adaptive post-threshold value $t_p$ is set to the minimum gray level value within the second valley. The system then uses the value $t_p$ to eliminate all gray values greater than the value of $t_p$. Referring back to block 316, if the current threshold value, t, is less than 25 the adaptive post threshold $t_p$ is set to 250. If the threshold t is greater than 25 block 317 decrements the threshold value by 5 and branches the program back to block 302.

From the preceding description it can be appreciated that there has been described a novel method and system for comparing the gray level of pixel elements, and also the topological features of pixel patterns to adaptively adjust the threshold of each individual document that is analyzed.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as fall within the true scope of the invention.

I claim:

1. A method of extracting relevant character information from a signal matrix of gray level picture elements comprising the steps of:

extracting the signals representing the gray level picture elements positioned approximately a first equal distance from a pixel of interest representing a first annular ring of picture elements;

extracting the signals representing the gray level picture elements positioned approximately a second equal distance from the pixel of interest representing a second annular ring of picture elements;

analyzing the extracted signals representing the first and the second annular ring of picture elements for like pairs of picture elements;

temporarily establishing the pixel of interest to be of a first binary value when there is at least one pair of picture elements and of a second binary value when there is not;

passing the gray level picture elements from the first and the second annular ring of picture elements as a function of the temporarily established pixels of interest of first binary value to eliminate all gray level picture elements corresponding to a pixel of interest being of a second binary value;

forming a histogram of the passed gray level picture elements; and utilizing the gray level picture elements of said histogram to establish a threshold point against which the gray level of the pixels of interest are compared to permanently establish the pixel of interest to be of a first binary value when its gray level is below the established threshold and of a second binary value when its gray level is above the established threshold.

2. The method according to claim 1 and further comprising the steps of:
   (a) identifying acceptable valleys found in said histogram; and
   (b) establishing said threshold point at the gray level value representing a second acceptable valley.

3. The method according to claim 2 wherein the step of identifying the valleys formed in said histogram is comprised of the steps of:
   determining the average gray level for each of the pixels in said first and said second annular rings of picture elements;
   identifying the minimum gray level values for the pixels in said first and said second annular rings; and
   determining the positions and the widths of the minimum gray level values.

4. The method according to claim 3 and further comprising the step of:
   eliminating all valleys, as nonacceptable, which have a number of pixels therein greater than a preselected number; and
   eliminating all valleys, as nonacceptable, which do not have a neighboring valley in the adjacent annular ring.

5. A system for processing a matrix of gray level picture elements comprising:
   an annular ring binarizer means for receiving gray level signals representing the gray scale intensity of corresponding picture elements located in a first and a second annular ring centered about a picture element of interest and for temporarily establishing the picture element of interest to be of a first binary value if at least one pair of like neighboring gray level signals are located in said first and said second annular rings;
   means for receiving said first binary valued signals and said gray level signals representing the gray scale intensity of the picture elements in said first and said second annular rings and for extracting the gray level signals corresponding to the temporarily established picture elements having a first binary value; and
   an adaptive post threshold means operatively coupled to said annular ring binarizer means for receiving said extracted gray level signal and for forming a gray level histogram based on the gray level signals, said means also deriving an adaptive threshold as a function of the characteristics of the gray level signals forming the gray level histogram which adaptive threshold determines the cut-off from consideration of the gray level signals which form the histogram that occur above the threshold.

6. A system according to claim 5 wherein said annular ring binarizer means is comprised of:
   averager means for receiving the gray level signals representing the picture elements in the first annular ring and for providing an average gray signal representing the average value of the gray level signal in said first annular ring;
   maximum, minimum means for receiving the gray level signals representing the picture elements in the first annular ring and for determining the maximum and minimum gray level signal values in said first annular ring;
   means for detecting the occurrence of a second valley in said gray levels as evidenced by the minimum gray signals falling below the average value of the gray level signals for a select period of time; and
   means for binarizing the gray level signals in the first annular ring as a function of the detected valleys and the average gray signal.

7. The system according to claim 6 wherein said averager is comprised of:
   an adder for receiving on a first input the gray level signals representing the first annular ring picture elements and for receiving on a second input a previous sum signal and for adding the two together to provide at its output a present sum signal;
   a latch for receiving the present sum signal from the output of said adder to provide at its output said previous sum signal;
   feedback means for coupling the previous sum signal from said latch back to the second input of said adder; and
   a divider responsive to the summing of the last gray level signal in the first annular ring for dividing the summed signal by the number of gray level signals considered to arrive at an average gray level signal value.

8. The system according to claim 7 wherein said divider is an addressable storage element the addresses of which correspond to gray values and the stored data of which corresponds to the address gray value divided by a preselected value to provide said average gray level signal.

9. The system according to claim 6 wherein said maximum, minimum means is comprised of:
   a first register for receiving and temporarily storing each of the received gray signals representing the picture elements in the first annular ring;
   a first comparator means coupled to said first register for comparing the value of the gray level signal presently stored in said first register against a previously compared gray value to determine which is less in value, the lesser value gray level signal is provided as a minimum gray level value at the output of said first comparator means; and
   a second comparator coupled to said first register for comparing the value of the gray level signal presently stored in said first register against a previously compared gray value to determine which is greater in value, the greater value gray level signal is provided as a maximum gray level value at the output of said second comparator means.

* * * * *